United States Patent
Hwang

(10) Patent No.: US 7,379,117 B2
(45) Date of Patent: May 27, 2008

(54) FLASH MODULE, CAMERA, AND METHOD FOR ILLUMINATING AN OBJECT DURING FLASH PHOTOGRAPHY

(75) Inventor: Yi-Feng Hwang, Perak (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 673 days.

(21) Appl. No.: 10/941,236

(22) Filed: Sep. 15, 2004

(65) Prior Publication Data

US 2006/0055818 A1 Mar. 16, 2006

(51) Int. Cl.
*G03B 15/05* (2006.01)

(52) U.S. Cl. .................... 348/371; 348/370; 396/175; 362/18

(58) Field of Classification Search ................ 396/199, 396/62, 175; 348/370–371, 216.1; 257/81; 362/3–18
See application file for complete search history.

(56) References Cited

U.S. PATENT DOCUMENTS

| | | | | |
|---|---|---|---|---|
| 4,187,020 A | * | 2/1980 | Ishii et al. | 396/144 |
| 4,276,579 A | * | 6/1981 | Yako | 362/5 |
| 4,423,940 A | * | 1/1984 | Kashihara et al. | 396/62 |
| 5,040,007 A | * | 8/1991 | Hagiuda | 396/155 |
| 5,347,339 A | * | 9/1994 | Terada et al. | 396/62 |
| 5,615,938 A | * | 4/1997 | Lemke | 362/18 |
| 5,772,302 A | * | 6/1998 | Ishikawa et al. | 362/3 |
| 5,895,128 A | * | 4/1999 | Kishimoto et al. | 396/61 |
| 5,911,085 A | * | 6/1999 | Fuke et al. | 396/62 |
| 6,072,954 A | * | 6/2000 | Onda | 396/61 |
| 6,479,942 B2 | * | 11/2002 | Kimura | 315/169.3 |
| 6,493,510 B2 | * | 12/2002 | Shimizu | 396/62 |
| 6,598,986 B2 | * | 7/2003 | Yano | 362/18 |
| 6,600,877 B2 | * | 7/2003 | Shimizu et al. | 396/62 |
| 6,734,913 B1 | * | 5/2004 | Motta | 348/362 |
| 6,782,197 B2 | * | 8/2004 | Yano | 396/175 |
| 6,826,364 B2 | * | 11/2004 | Kawasaki et al. | 396/157 |
| 6,856,356 B1 | * | 2/2005 | Kahn | 348/371 |
| 6,899,435 B2 | * | 5/2005 | Yamanaka | 353/94 |
| 6,979,093 B2 | * | 12/2005 | Tsay | 362/8 |
| 7,085,489 B2 | * | 8/2006 | Yamashita | 396/157 |
| 7,212,243 B2 | * | 5/2007 | Kawamura | 348/362 |
| 2003/0095406 A1 | * | 5/2003 | Lebens et al. | 362/231 |
| 2003/0107656 A1 | * | 6/2003 | Ito et al. | 348/216.1 |
| 2004/0085745 A1 | * | 5/2004 | Yoshihara | 362/8 |
| 2004/0146292 A1 | * | 7/2004 | Kawakami | 396/200 |
| 2005/0162543 A1 | * | 7/2005 | Kobayashi | 348/371 |

OTHER PUBLICATIONS

"Fresnel Lenses", Fresnel Technologies, Inc., 2003, pp. 1-12.

* cited by examiner

*Primary Examiner*—David Ometz
*Assistant Examiner*—Pritham D. Prabhakher

(57) ABSTRACT

A flash module includes a point light source, a lens assembly, an actuator mechanism, and a control system. The lens assembly includes a lens that is positioned in front of the point light source. The actuator mechanism enables adjustment of the distance between the lens assembly and the point light source. The control system is provided to flash the point light source. A camera including a flash module, and a method for illuminating an object during flash photography, are also disclosed.

17 Claims, 3 Drawing Sheets

FLASH MODULE, CAMERA, AND METHOD FOR ILLUMINATING AN OBJECT DURING FLASH PHOTOGRAPHY

BACKGROUND

When photographing an object in low ambient light, a flash is often used to illuminate the object. To provide for illuminating objects at various distances, and in different levels of ambient light, some flashes provide a means for adjusting the intensity of their light.

SUMMARY OF THE INVENTION

In one embodiment, a flash module comprises a point light source, a lens assembly, an actuator mechanism, and a control system. The lens assembly comprises a lens that is positioned in front of the point light source. The actuator mechanism is provided to adjust the distance between the lens assembly and the point light source. The control system is provided to flash the point light source.

In another embodiment, a camera comprises an image capture system and a flash module. The flash module comprises a point light source, a lens assembly, an actuator mechanism, and a control system. The lens assembly comprises a lens that is positioned in front of the point light source. The actuator mechanism is provided to adjust the distance between the lens assembly and the point light source. The control system is provided to flash the point light source in sync with an image capture cycle of the image capture system.

In yet another embodiment, a method for illuminating an object during flash photography comprises 1) adjusting the distance between a lens assembly and a point light source, and 2) triggering the point light source to temporarily illuminate the object.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

A typical camera flash module comprises a light source (e.g., a light bulb) that is mounted at a fixed distance from a protective lens. At times, the lens is merely a transparent piece of glass or plastic. At other times, the lens may be configured to focus the light produced by the flash module's light source. In either case, the flash module provides one, preset dispersion of light for illuminating an object that is to be photographed.

Sometimes, as a result of an object being closer to or farther from a flash module, or as a result of different levels of ambient light, a flash fails to adequately illuminate an object that is being photographed. One prior solution to this problem was to provide a means for adjusting the intensity of the flash's light source. In this manner, the intensity of a flash can be increased 1) when photographing an object that is farther away, or 2) when photographing an object that is illuminated by little or no ambient light. However, adjusting the intensity of a flash's light source does nothing to change the preset dispersion of light produced by a flash module. If one could change this light dispersion, a flash could be used to project a narrower beam of higher intensity light, or a broader beam of lower intensity light. This sort of ability would be especially useful in a low-cost flash module, such as that which might be provided in a camera phone or a camera-equipped personal digital assistant (PDA). To this end, FIGS. 1-5 illustrate various means for providing such an abililty.

Figure 1:
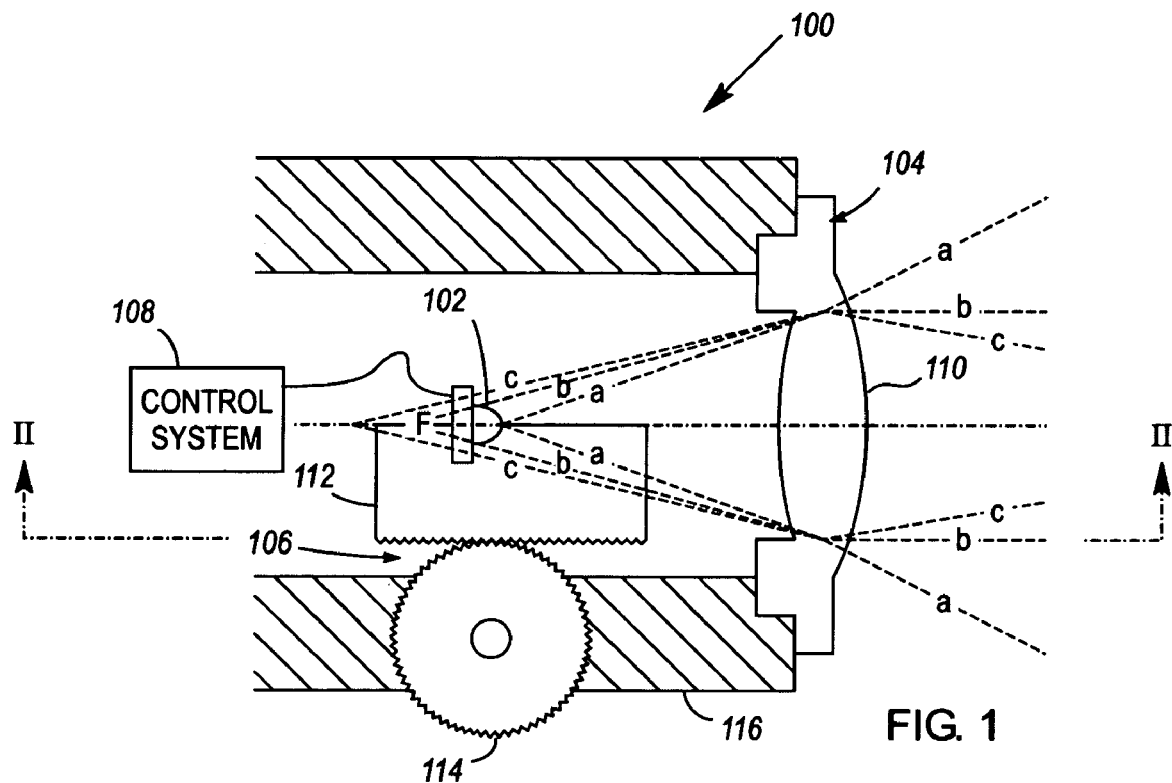
FIGS. 1 & 2 respectively illustrate plan and elevation views of an exemplary flash module having a point light source that is an adjustable distance from a lens assembly.
Figure 2:
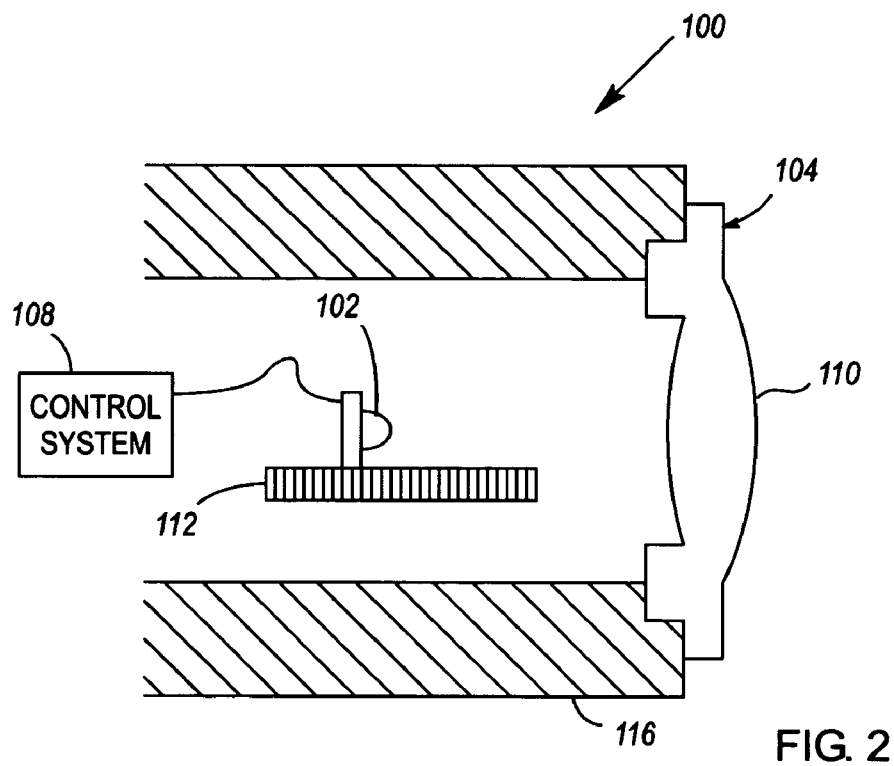
Figure 3:
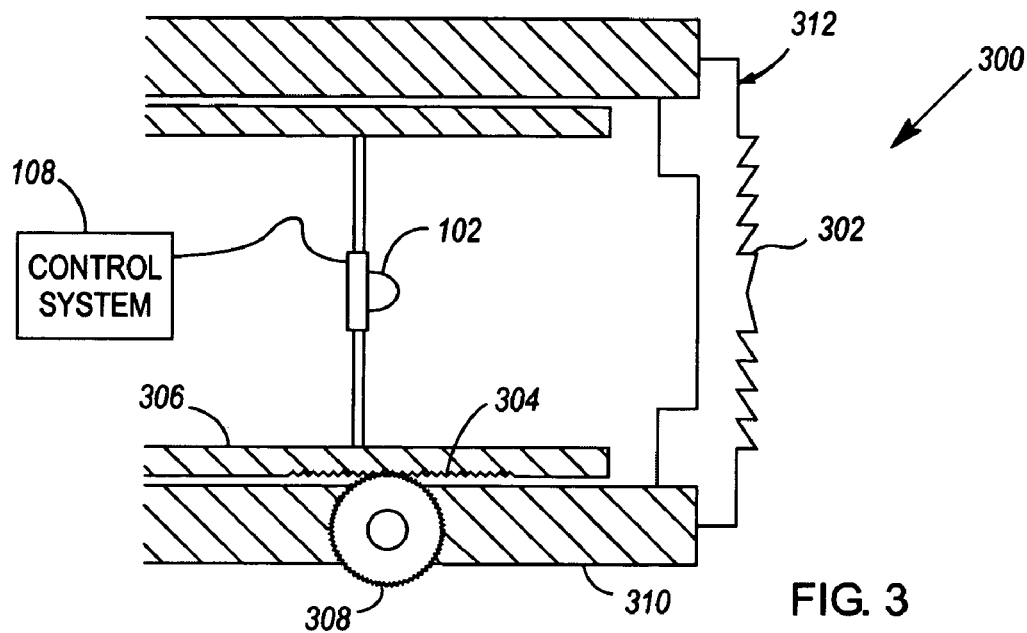
FIG. 3 illustrates a plan view of a second exemplary flash module having a point light source that is an adjustable distance from a lens assembly.

FIGS. 1 & 2 respectively illustrate plan and elevation views of a first exemplary flash module 100. The flash module 100 comprises a point light source 102, a lens assembly 104, an actuator mechanism 106, and a control system 108. The point light source 102 may take various forms, but is preferably a light emitting diode (LED). The lens assembly 104 comprises a lens 110 that is positioned in front of the point light source 102. Preferably, the lens 110 and light source 102 are centered about a common axis. As shown in FIGS. 1 & 2, the lens 110 can take the form of a concave lens. However, as shown in FIG. 3, the lens could also take the form of a fresnel lens 302. Other lens configurations are also possible, depending on the range of light dispersions that a product designer is trying to achieve.

The flash module's actuator mechanism 106 provides a means to adjust the distance between the lens assembly 104 and the point light source 102. This can be done by moving the light source 102 in relation to the lens assembly 104, or by moving the lens assembly 104 in relation to the light source 102.

In one embodiment, the actuator mechanism 106 may be implemented as a rack and pinion actuator mechanism wherein, for example, a rack 112 is attached to the light source 102, and a pinion gear 114 is mounted in the side of a housing 116 in which the light source 102 is movably mounted (see FIGS. 1 & 2). In this manner the pinion gear 114 could also serve as a dial that enables a user to manually operate the actuator mechanism 106. Alternately, a rack 304 could be embossed on a housing 306 in which the light source 102 is mounted, and the pinion gear 308 could be mounted in the side of a barrel 310 in which the lens assembly 312 is mounted (see the flash module 300 illustrated in FIG. 3). In this manner, the barrel 310 cooperates with the housing 306 to alternately retract toward, or extend from, the housing 306. Other forms of mechanical or electrical actuator systems could also be used.

As the distance between the point light source 102 and lens assembly 104 is adjusted, the illumination angle of light emitted from the lens 110 is adjusted and, as a consequence, the dispersion of light provided by the flash module 100 is also adjusted. If the light source 102 is positioned at the focal point (F) of the lens 110, then the light emitted from the lens 110 should be substantially collimated (i.e. extending as beams "b" that are substantially parallel to, and confined about, the optical axis of the lens 110). If the light source 102 is positioned within the focal point of the lens 110, as shown in FIG. 1, then the light emitted from the lens 110 will diverge, as illustrated by beams "a". The illumination angle of the divergent beams "a" will vary depending on the exact position of the light source 102 in relation to the lens 110. Conversely, if the light source 102 is positioned beyond the focal point of the lens 110, then the light emitted from the lens 110 will converge, as illustrated by beams "c". Again, the illumination angle of the convergent beams "c" will vary depending on the exact position of the light source 102 (and at some distance from the lens 110, the beams "c" will intersect and then begin to diverge).

In its simplest form, the flash module's control system 108 merely serves to flash the module's light source 102. However, in another embodiment, the control system 108 may provide both a flash mode and a steady-state mode. In this manner, a user of the flash module 100 can enter the steady-state mode to activate and deactivate the light source 102 at will (e.g., to use the flash module 100 as a flashlight or constant illumination source).

Figure 4:
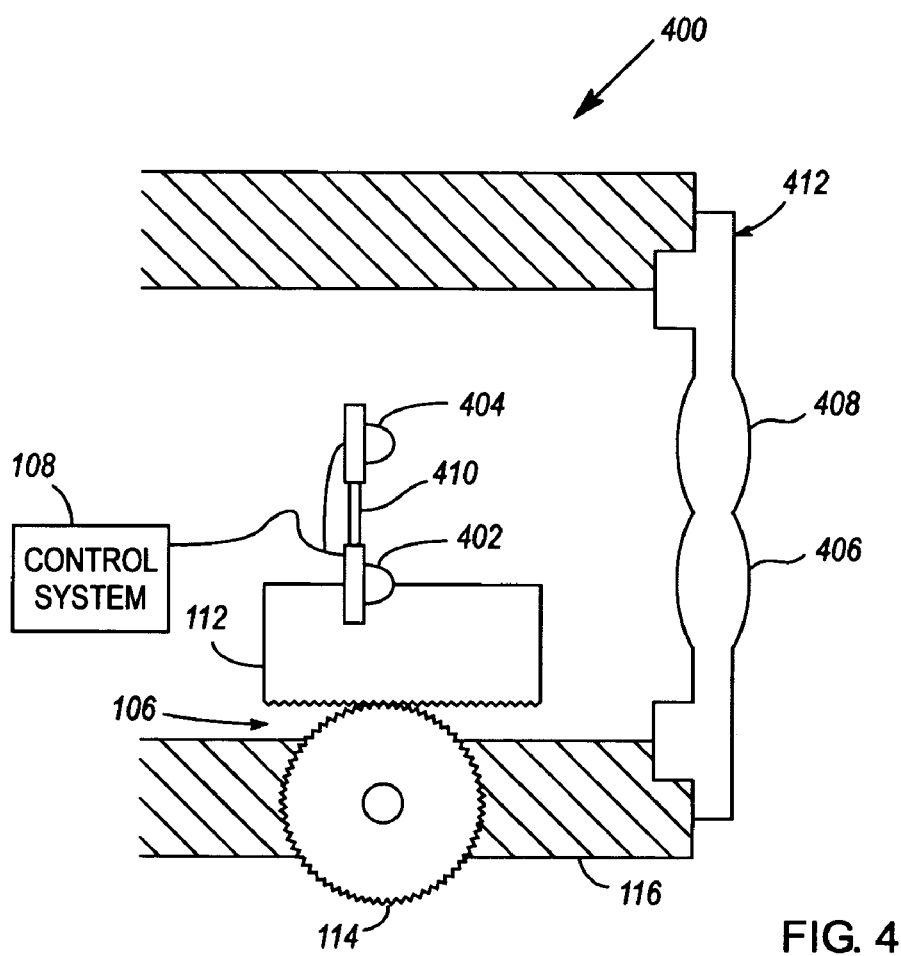
FIG. 4 illustrates a plan view of an exemplary flash module having a plurality of point light sources that are an adjustable distance from a lens assembly.

As shown in FIG. 4, a flash module 400 may alternately comprise a plurality of point light sources 402, 404, respectively positioned behind a plurality of lenses 406, 408. Preferably, the light sources 402, 404 are fixed to a common substrate 410 or housing, and the lenses 406, 408 are formed within a uni-body lens assembly 412 (e.g., a single plexiglass device having each of the lenses 406, 408 embossed therein). In use, the plurality of light sources 402, 404 and lens assembly 412 may be moved with respect to each other as disclosed in either of FIGS. 1 or 2. If the light sources 402, 404 are moved, they are preferably moved in tandem, as a single unit.

Figure 5:
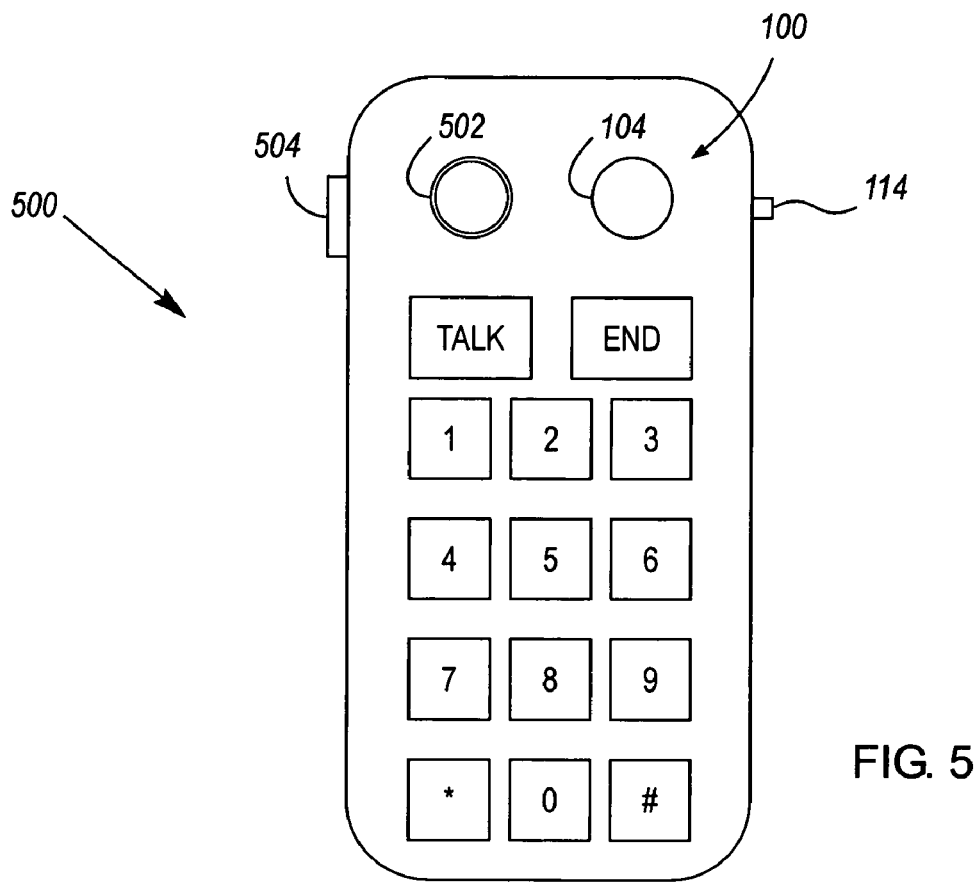
FIG. 5 illustrates an exemplary camera in which the FIG. 1 flash module could be mounted.
Figure 6:
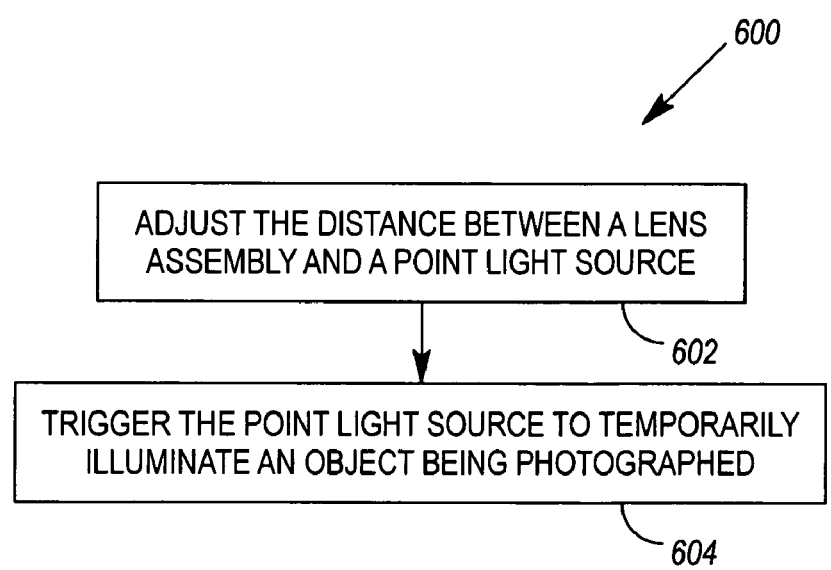
FIG. 6 illustrates an exemplary method for illuminating an object during flash photography.

FIGS. 5 & 6 illustrate the exemplary installation and use of the flash module 100 in a camera 500. As shown in FIG. 5, the camera 500 may take the form of a camera phone.

By way of example, the flash module 100 may be entirely retained within the outer housing of the camera phone 500, with the lens assembly 104 of the flash module 100 being fitted to the outer housing of the camera phone 500 by, for example, a mechanical clip, screws, adhesive, or ultrasonic welding. Additionally, the dial 114 or other means for controlling the actuator mechanism 106 may project through the outer housing of the camera phone 500.

In addition to the flash module 100, the camera phone 500 comprises an image capture system 502. When illuminating an object during flash photography, a user may adjust the distance between the lens assembly 104 and point light source 102 of the flash module 100, and then trigger the point light source 102 to temporarily illuminate the object. Preferably, the point light source 102 is triggered in sync with an image capture cycle of the image capture system 502 by, for example, pressing a picture-taking button 504 on the camera phone 500.

What is claimed is:

1. A flash module, comprising: a point light source having a rack attached thereto: a lens assembly comprising a lens positioned in front of the point light source, the lens assembly fixedly mounted on a housing inside which the point light source is movably mounted; and a pinion gear attached to the housing and coupled to the rack of the point light source, the pinion gear configured as a dial operable through direct contact by a user to manually move the point light source for varying the distance between the lens assembly and the point light source; and a control system to flash the point light source.

2. The flash module of claim 1, wherein the point light source is a light emitting diode.

3. The flash module of claim 1, wherein the control system provides a flash mode and a steady-state mode, and wherein the control system activates and deactivates the point light source in the steady-state mode.

4. The flash module of claim 1, wherein the control system is configured to have no control over operations of the rack and the pinion.

5. The flash module of claim 1, wherein the housing is part of a camera phone, and the lens assembly is immovably mounted on the housing of the camera phone.

6. The flash module of claim 5, wherein the lens assembly is immovably mounted on the housing of the camera phone by a screw.

7. A camera phone, comprising: an image capture system; and a flash module, comprising: a point light source having a rack attached thereto; a lens assembly comprising a lens positioned in front of the point light source, the lens assembly fixedly mounted on an outer housing of the camera phone; and a pinion gear attached to the outer housing of the camera phone, the pinion gear coupled to the rack of the point light source, the pinion gear configured as a dial operable through direct contact by a user to manually move the point light source for varying the distance between the lens assembly and the point light source.

8. The camera of claim 7, wherein the point light source is a light emitting diode.

9. The camera phone of claim 7, further comprising:
a control system for setting the flash module in one of a) a flash mode or b) a steady-state mode, wherein when operating in the steady-state mode, the camera phone is configured as a flashlight having a variable illumination angle that is manually set using the pinion gear attached to the outer housing of the camera phone.

10. The camera phone of claim 9, wherein the steady state mode is selectable at will by the user for activating or deactivating the flashlight.

11. The camera phone of claim 10, wherein the steady state mode is selectable independent of the flash mode.

12. The camera phone of claim 9, wherein the steady state mode is selectable for temporarily illuminating an object being photographed, the temporary illumination being carried out using the variable illumination angle.

13. A flash module, comprising: a light fixture comprising a plurality of point light sources; an actuator mechanism comprising a rack, the light fixture mounted on the actuator mechanism; a lens assembly comprising a plurality of lenses, the lens assembly fixedly mounted on a housing inside which the light fixture is movably mounted; and a pinion gear attached to the housing and coupled to the rack of the actuator mechanism, the pinion gear configured as a dial operable through direct contact by a user to manually move the light fixture for varying the distance between the light fixture and the lens assembly.

14. The flash module of claim 13, wherein the plurality of point light sources is mounted on a substrate that is attached to the actuator mechanism.

15. The flash module of claim 14, wherein the lens assembly comprises a plexiglass having the plurality of lenses embossed therein.

16. The flash module of claim 13, wherein the housing is part of a camera phone, and the lens assembly is immovably mounted on the housing of the camera phone.

17. The flash module of claim 16, wherein the lens assembly is immovably mounted on the housing of the camera phone by a screw.

* * * * *